(12) United States Patent
McGrew

(10) Patent No.: US 7,492,517 B2
(45) Date of Patent: Feb. 17, 2009

(54) FORM BIREFRINGENT GRATING STRUCTURE, VIEWER, ANTICOUNTERFEIT SECURITY DEVICE, AND METHOD FOR MAKING THE SAME

(75) Inventor: Stephen P. McGrew, Spokane, WA (US)

(73) Assignee: New Light Industries, Ltd., Spokane, WA (US)

( * ) Notice: Subject to any disclaimer, the term of this patent is extended or adjusted under 35 U.S.C. 154(b) by 15 days.

(21) Appl. No.: 11/192,205

(22) Filed: Jul. 27, 2005

(65) Prior Publication Data

US 2007/0024975 A1 Feb. 1, 2007
US 2008/0204876 A9 Aug. 28, 2008

Related U.S. Application Data

(63) Continuation-in-part of application No. 10/431,300, filed on May 6, 2003, now Pat. No. 6,975,765.

(51) Int. Cl.
*G02B 27/28* (2006.01)
(52) U.S. Cl. ..................................... 359/494
(58) Field of Classification Search ............... 359/494
See application file for complete search history.

(56) References Cited

U.S. PATENT DOCUMENTS

| 5,493,555 | A | * | 2/1996 | Kimura et al. | ......... 369/110.03 |
| 5,694,247 | A | * | 12/1997 | Ophey et al. | ................ 359/566 |
| 2003/0128349 | A1 | * | 7/2003 | Unno | ......................... 355/67 |
| 2004/0095637 | A1 | * | 5/2004 | Nikolov et al. | ............... 359/352 |
| 2004/0223156 | A1 | * | 11/2004 | McGrew et al. | ............. 356/364 |
| 2005/0259302 | A9 | * | 11/2005 | Metz et al. | ..................... 359/15 |

* cited by examiner

*Primary Examiner*—Joshua L Pritchett
(74) *Attorney, Agent, or Firm*—Dorsey & Whitney LLP (57) ABSTRACT

The invention relates to an anticounterfeiting device comprising a form birefringent surface relief structure bearing a colored three-dimensional polarization image. The structure may be composed of pixels whose surface relief microstructure and composition determines the direction and color of zero-order diffracted light visible from each pixel when the structure is illuminated with polarized light and viewed through an analyzer that passes light of the opposite polarization.

4 Claims, 5 Drawing Sheets

FORM BIREFRINGENT GRATING STRUCTURE, VIEWER, ANTICOUNTERFEIT SECURITY DEVICE, AND METHOD FOR MAKING THE SAME

CROSS-REFERENCE TO RELATED APPLICATION

This application is a continuation-in-part of U.S. patent application Ser. No. 10/431,300, filed May 6, 2003, U.S. Pat. No. 6,975,765, issued Dec. 13, 2005.

TECHNICAL FIELD

This invention relates to improvements concerning form birefringent grating structures used in anticounterfeit security devices, and, more particularly, to a viewer for form birefringent grating structures, an anticounterfeit security device comprising the form birefringent grating structure and a method for making the same.

BACKGROUND OF THE INVENTION

In the document and product security industry, it is desirable to have a low-cost anti-counterfeiting device that can be used easily by any consumer. Ideally, the device is inexpensive to make but impossible to duplicate, and easy to verify but applicable to large numbers of different documents and products. Known anti-counterfeit measures do not sufficiently satisfy these conditions. Therefore a need exists for low-cost, easy to use anticounterfeit devices that provides a high level of security.

A grating layer on a surface shows interesting properties. The effective refractive index of a grating layer on a surface depends on the grating orientation and grating profile, as well as on the bulk properties of the material composing the layer. Specifically, when the grating period is significantly smaller than the wavelength of light incident on the grating or shorter than half a wavelength of a selected color of light, the effective refractive index is higher if the electric field vector of the light is aligned with the grating lines rather than being perpendicular to the grating lines. If in addition the grating layer comprises a metallic material, the complex reflectivity of the layer depends on the alignment of the electric field vector relative to the grating lines. "Complex reflectivity" refers to the phase shift as well as the amplitude change in each polarization component of the reflected light. In the first case, the grating layer is birefringent, and in the second case the grating layer is a reflective polarization modifier. Both are referred to herein as cases of "form birefringence", which herein means both the property of altering the polarization of light by differently retarding light of different polarizations, and the property of altering the polarization of light by differently absorbing or reflecting light of different polarizations, as a result of the profile shape of a surface on a subwavelength scale.

Form birefringence has been demonstrated and reported by several researchers, and is exploited commercially. For example, Nano-Opto Corporation sells a "Subwave Polarization Beam Splitter/Combiner" and a "Broadband Polarizer For Optical Networking Applications" that employ surface relief gratings having a period smaller than an optical wavelength.

When illuminating a form birefringent grating structure with polarized light and viewing the reflected (or transmitted) light, color effects can be observed that depend on the orientation of the grating structure with respect to the polarizer directions and the depth of the grating structure. Due to the combination of color and polarization properties of the form birefringent grating structure, it is difficult to duplicate or reverse engineer it. Furthermore, verification is easy by employing standard linear or circular polarizers.

SUMMARY OF THE INVENTION

A form birefringent grating structure includes a grating region formed on a substrate. The grating region has a grating period that is shorter than half a wavelength of a selected color of light so that the polarization of light incident on the grating structure is altered. The grating region also has a selected depth corresponding to a half wavelength of the selected color of light. As a result, the grating region presents color effects depending on the grating orientation and depth when illuminated with polarized light and viewed through a polarizing filter. The form birefringent grating structure may be used as an anticounterfeit security device by impressing the grating structure into the surface of a non-simply connected layer of material.

DETAILED DESCRIPTION OF PREFERRED EMBODIMENTS

Figure 1:
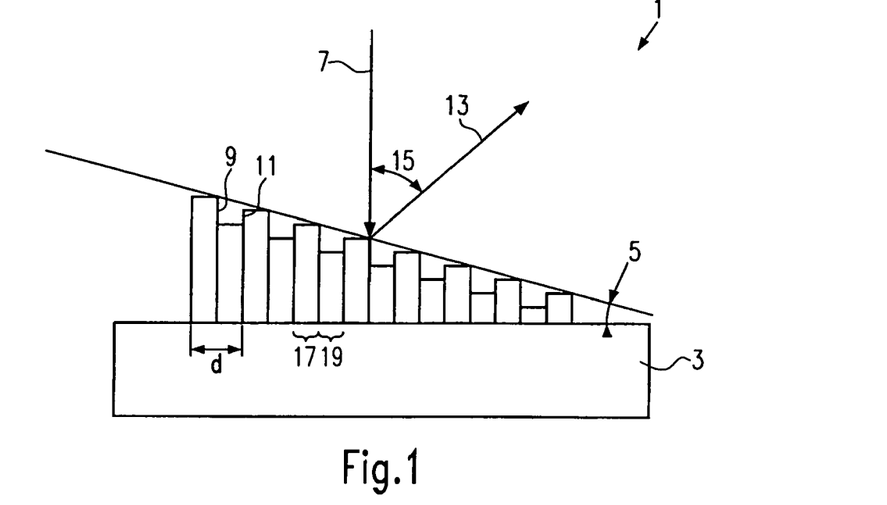
FIG. 1 a cross-sectional view of a form birefringent grating structure according to a first embodiment of the invention, FIG. 2 a cross-sectional view of a portion of a form birefringent grating structure according to a second embodiment of the invention, FIG. 3 a cross-sectional view of a portion of a form birefringent grating structure according to a third embodiment of the invention, wherein the grating is divided into vertical strips, alternate strips having effective tilts to reflect zero-order diffracted light to the left eye and right eye respectively of a person viewing the grating, FIG. 4 a cross-sectional view of a portion of a form birefringent grating structure according to a fourth embodiment of the invention, wherein a grating is divided into multiple sets of vertical strips, each set comprising strips with a series of effective tilts designed to reflect zero-order diffracted light into a series of directions corresponding to viewing directions of the component images of a multi-stereo image.

FIG. 1 illustrates a form birefringent grating according to a first embodiment of the invention. A grating structure 1 is provided on a substrate 3. The grating structure has an effective tilt, with a predetermined tilt angle 5, with respect to the surface of the substrate 3. The term "effective tilts" as used herein refers to the surface normals of gratings of different regions of the grating can having different angles with respect to incoming light that is incident from a certain direction. In practice the grating structure is provided on a substrate and the surface normals of the different regions can have different angles with respect to the surface normal of the substrate. In addition to color and polarization effects, already mentioned above, zero order diffracted light is reflected into different directions depending on the effective tilt of the regions. The term "zero order diffracted" (or zero order reflected), as used herein, is ordinarily equivalent to specular reflection with higher diffracted orders removed. In the case of a form birefringent grating, zero order diffraction alters the polarization state of specularly reflected light in a wavelength-dependent way, thus making the grating structure even more difficult to counterfeit. The grating 1 which is an arrangement of essentially parallel stripes, has, in the cross-section view, a columnar structure with a grating period d which is shorter than half a wavelength of a selected color of incident light 7, to be capable of altering the polarization properties of the incident light. The effective depth of the grating is the average wall height, which is half the sum of the heights of wall 9 and wall 11. Due to the tilted grating surface the zero-order reflected light beam 13 is reflected at an angle 15 to the normal 7, which is twice the effective tilt angle 5.

The color observed when the zero order reflected beam 13 is viewed through a circular polarizer (not shown) at a given orientation is dependent upon the effective depth of the grating structure 1. The form birefringent grating structure according to one embodiment of the invention uses a controlled grating depth which can advantageously be used to control the apparent color of the grating when viewed in polarized light and through a polarizing filter. The brightness of the color observed is dependent upon the duty cycle of the grating structure 1, that is the ratio of the width of the ridges 17 to the width of the grooves 19. The detailed shapes of the ridges 17 and grooves 19 may also be altered and thereby affect the brightness and color. Furthermore the orientation of the grating with respect to the incident light may also alter the color and polarization properties of the reflected beam. The orientation of the grating can be changed by turning the grating structure 1 around the normal 7.

Herein "circular polarizer" is a film laminate composed of a linear polarizer on top of a quarter-wave plate, such that light passing through from the top and striking a specularly reflective surface below the laminate and reflecting back to the laminate without any alteration of its polarization state at the surface will be absorbed by the polarizing filter as it exits the laminate. Thus, only light whose polarization is altered upon reflection from a surface is visible through a circular polarizer placed on the surface.

Figure 2:
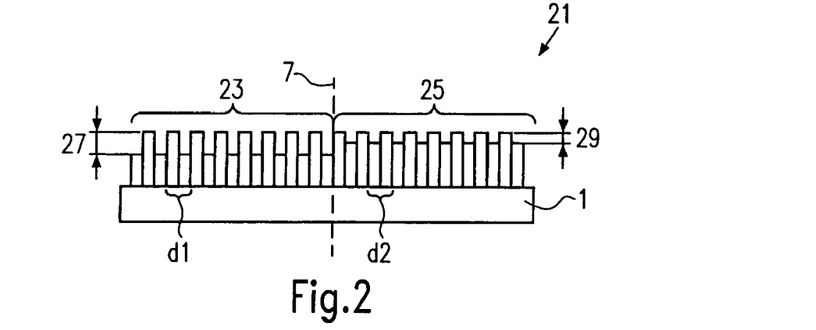

FIG. 2 illustrates a form birefringent grating structure according to a second embodiment of the invention. The form birefringent grating structure 21 comprises two different grating regions 23, 25 having different grating characteristics, wherein each grating is according to the first embodiment (grating structure 1). Each of the rating regions 23, 25 are formed with grooves and ridges of a substantially rectangular cross-section with a groove depth selected to correspond to predetermined wavelengths of light and a grating period substantially shorter than the corresponding predetermined wavelength of light. As a result, zero-order diffracted light from the regions 23, 25 can form an image composed of different polarizations and colors. Thus by providing several regions with different characteristics an image (e.g. a logo, etc.) with certain color and polarization properties can be provided which further enhances the difficulty of copying or reverse-engineering the grating structure 21. The grating structure 21 can of course also comprise more than two regions and is thus not limited to the example of two. As in the first embodiment the grating structure 21 is provided over a substrate 1, but the structure in FIG. 2 does not show an effective tilt with respect to the substrate surface. However, according to variants, the grating regions 23, 25 can also be provided with the same or different effective tilts. Furthermore, the two regions 23 and 25 can have different groove depths 27 and 29. The different groove depths 27 and 29 cause the zero order reflected light to have two different colors. In addition, the grating period d1, d2 of each grating region 23, 25 could be chosen to be different, such that, in addition to the color effect, a different polarization behavior, in particular wavelength dependent behavior, occurs for each region. As a result, the grating regions 23, 25 together can display a multicolor image when illuminated by white light of a first polarization state and viewed through an analyzer arranged such that essentially the polarization state parallel or orthogonal to the first polarization state passes. According to further variants, the two grating regions 23, 25 may have different orientations, corresponding to different azimuthal angles with respect to the substrate normal 7.

Figure 3:
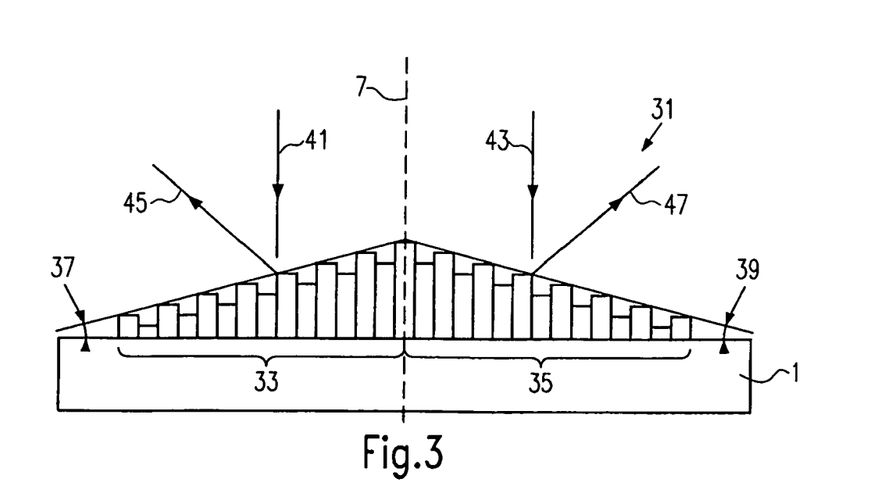

FIG. 3 illustrates a form birefringent grating structure according to a third embodiment of the invention. The form birefringent grating structure 31 according to the third embodiment comprises two different grating regions 33, 35, wherein each grating is according to the first embodiment (grating structure 1), the features and properties of which are incorporated herewith by reference. The grating structure 31 is not limited to two different regions but may comprise more than two regions. Due to the different effective tilts 37, 39 with respect to the surface of the substrate 1, light 41, 43 incident onto the two regions 33, 35 from a same direction is reflected into two different directions 45, 47.

This property of the complex form birefringent grating 31 can advantageously be used to display a three-dimensional stereoscopic image. Stereographic images are composed of two complementary images configured such that when one is viewed by one eye only of a person viewing the image and the other one viewed by the other eye, the human brain will make the viewer see a three dimensional image. If thus the tilts of two regions of the grating structure are configured such that their corresponding images can be viewed by a person in a stereoscopic way, the image observed does not only present color and polarization effects, but also presents a three dimensional illusion. Thus when viewing the grating in polarized light it becomes easy for a user to identify whether the grating is an original or not, as the grating according to this embodiment makes it even more complicated for somebody to copy it. The grating embodiment shown in FIG. 3 can consist of regions 33, 35 having left and right effective tilt angles 37 and 39, with tilt angles of about 1.5 degrees left and 1.5 degrees right, respectively, so that at a convenient viewing distance of about 45 cm (about 18 inches) the zero orders from the two regions 33, 35 are directed to the left and right eye respectively of an observer (not shown). Thus, the color and brightness properties of each region 31 and 35 are perceived only by the corresponding eye. If the region segments are small enough not to be directly resolved by the unaided human eye (e.g., smaller than about 0.0127 cm (1/200 inch)), and each region 31, 33 displays a corresponding one of a pair of stereoscopic images, an observer will perceive a stereo image which may form a 3D image. Because the color and brightness of the form birefringent grating may be controlled at each location independently by controlling the effective grating depth and duty cycle, the stereoscopic image may also be a multicolored image, for example if it is composed of pixels like those shown in FIG. 5 and explained further down. Furthermore by altering the grating period, wavelength dependent polarization effects also occur.

Figure 4:
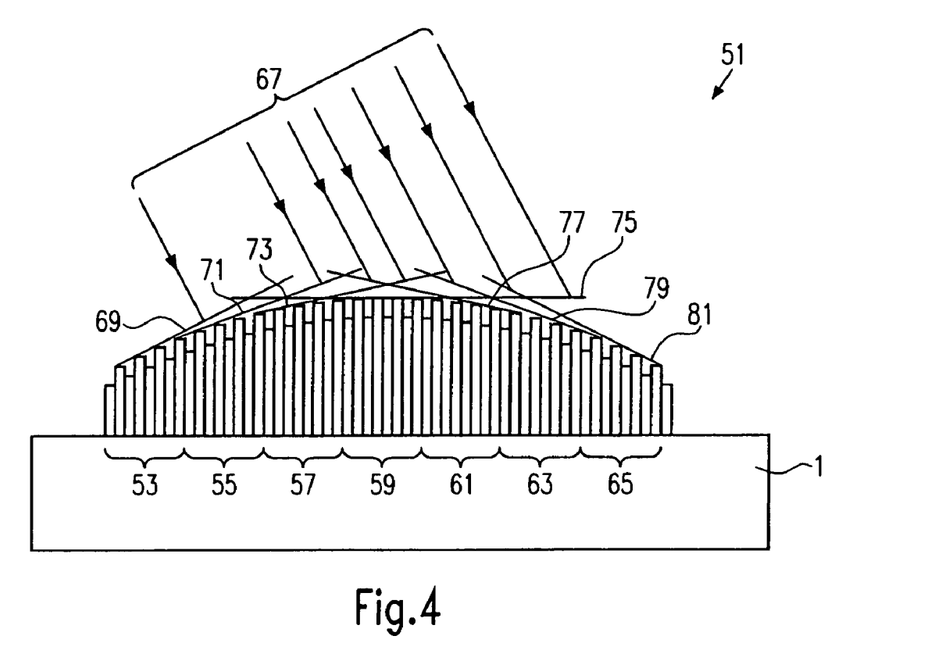

The principles described above can be extended to more than two stereoscopic channels by interleaving multiple stereo images, each with its appropriate tilt as illustrated in FIG. 4. The grating structure 51 comprises 7 different regions 53, 55, 57, 59, 61, 63, 65 each having a different effective tilt with respect to the substrate 1. Each region 53, 55, 57, 59, 61, 63, 65 has a different effective tilt 69, 71, 73, 75, 77, 79, 81, respectively, according to one of the previously described grating structures.

The grating structure 51 of FIG. 4 directs zero order incident light 67 from a predetermined direction into seven different directions corresponding to its seven different effective tilts 69, 71, 73, 75, 77, 79, 81; but there is no inherent limit to the number of distinct directions and corresponding effective tilts that may be used. Each region may also vary in grating period, grating depth, etc., to alter the color and/or polarization properties of the zero order reflected light. The different regions 53, 55, 57, 59, 61, 63, 65 can furthermore be configured such that two or more regions provide a 3D stereoscopic image, viewable in a predetermined range of directions.

Figure 5:
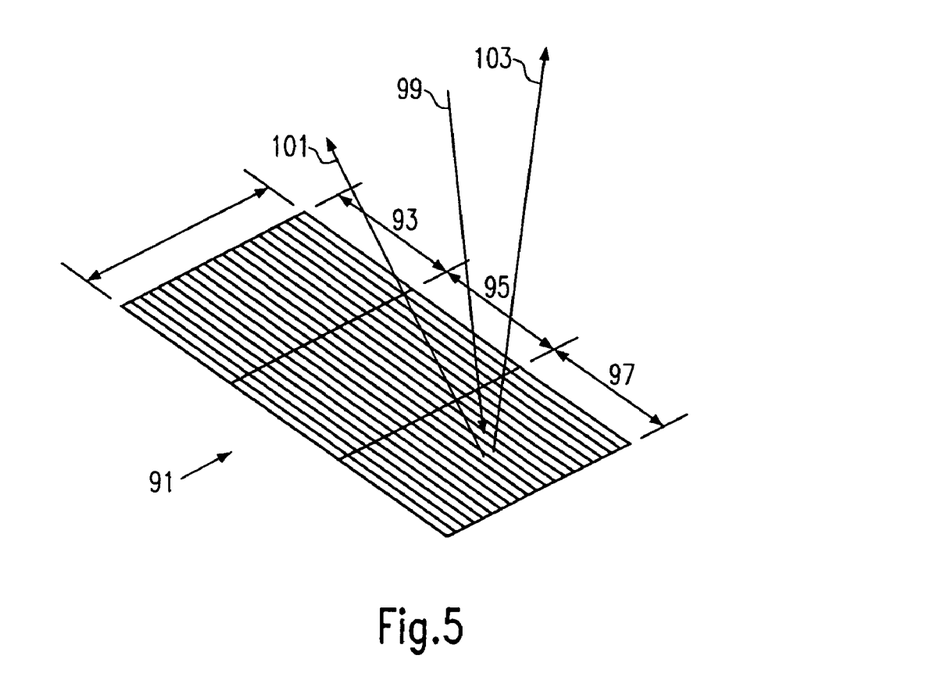
FIG. 5 an aerial view of a portion of a form birefringent grating structure according to a fifth embodiment of the invention, which provides a three-dimensional multicolored image, wherein top, middle and bottom sections of the grating, representing a pixel of a pixel array, diffract light that may be seen respectively as red, green and blue.

One way to provide a color 3D stereoscopic image is to compose a form birefringent grating structure as an array of pixels according to a fifth embodiment of the invention. One such pixel 91 is illustrated in FIG. 5. In the grating pixel 91 of FIG. 5, which represents one pixel of an array, the top region 93 provides a red sub-pixel, the middle region 95 provides a green subpixel, and the bottom region 97 provides a blue subpixel. The grating structure of each subpixel 93, 95, 97 is composed of columnar regions having different effective tilt angles as shown in FIG. 3 or 4 so that incident light 99 is reflected into different directions 101, 103. The red, green, and blue colors are determined by controlling the effective depth of the form birefringent grating in each subpixel 93, 95, 97 and the respective brightness can be controlled by the duty cycle of the grating. When viewed in one polarization direction the subpixels may be seen as red, green and blue; while in another direction the subpixels may be seen as cyan, magenta and yellow respectively. That is, a subpixel's color in one orientation is the complement of its color in the orthogonal orientation. Thus the pixel array can provide a 3D stereoscopic color image or a plurality of images. Regions of different tilt angle will form images viewable under different directions.

The dependence relationships between color, depth, orientation and complex refractive index of the high-frequency grating grooves and ridges at each pixel may be determined using standard numerical or analytical methods based on Maxwell's equations. The desired groove depth is thus calculated based on choice of grating material optical properties and the optical properties of any material that will fill the grooves in the grating.

The pixels 91 can be made to provide a color ranging from the infrared through the visible and into the ultraviolet by using a controlled groove depth designed to provide the desired color. If the groove depth is substantially shallower than a half-wavelength of visible light, the pixels are essentially achromatic, displaying gray tones rather than distinct, saturated colors.

According to a variant the form birefringent grating structures of the aforementioned embodiments can be further composed of regions of variously oriented gratings, such that when viewed through a polarizing filter whose properties differ in regions registered with respect to the regions on the form birefringent grating structure, the form birefringent grating structure image appearance depends on the position, shape and orientation of the polarizing filter's differently oriented regions, and such that when the polarizing filter is registered in at least one particular way with respect to the form birefringent grating structure the form birefringent grating structure has a particular predetermined appearance. With such an arrangement it is possible to provide the form birefringent structure with information that may only be viewed with the corresponding polarizing filter. Another advantage is that only slight deviations in the grating structure which are usually present in copied structures can be immediately recognized due the fact that viewed through the corresponding polarizing filter the corresponding image will show unusual subregions with e.g. black stripes, which can be easily identified.

The grating frequency or amplitude also may be modulated with a spatial period longer than a half-wavelength of the light so that light incident on the structure is diffracted into higher than zero orders. This effect, when accidental, is commonly known as "ghosting". It can occur when there are periodic errors during fabrication, in the position or depth of the grating. For example, in electron-beam fabricated gratings, ghosting can be caused by uneven friction in drive screws, round-off errors in positioning algorithms, or finite step size in stepping motors. A very high frequency (short period) grating that is free of ghosting will show no diffraction effects. However, if ghosting is present with a period greater than half of the wavelength of visible light, diffraction effects appear, showing rainbow colors in white light. The polarization effects of the high-frequency grating are still apparent, however, in direct reflection (zero-order diffraction. Intentionally introducing ghosting and equivalent effects can add to the complexity of the grating and increase the difficulty of counterfeiting it.

One way to fabricate the above mentioned grating structures is to use e-beam fabrication using a resist, e.g. PMMA, covered substrate, wherein groove depth is controlled by the electron acceleration voltage, current and dose, the beam diameter and scanning speed, as well as by the resist composition and the development procedure. In order to optimize the groove depth to provide a desired color when the grating is viewed through a polarizing filter, it is preferred to perform a series of calibration tests, varying those parameters incrementally. The optimum parameter values are those corresponding to the test that provides results closest to the desired results. A pixel may be effectively tilted by increasing the e-beam dose in successive ridges and grooves to provide increasing etch depth from left to right or right to left. The dose is preferably controlled at each ridge and groove so that the grooves are essentially all of the same depth (to provide a controlled, uniform color) while the tops of the ridges stairstep down gradually to form a surface that is effectively tilted at the desired angle. A zero-order beam diffracted from the grating at each pixel will therefore exit the surface at an angle to the incident beam twice as great as the tilt angle.

Alternatively, grating structures may be provided with an effective tilt in which the ridges and groove bottoms are themselves tilted at the tilt angle. Moreover, the grooves may be etched normal to a tilted surface segment by anisotropic etching methods.

In alternative embodiments, the original grating structure may be formed by methods other than electron-beam, such as XUV microlithography, near-field optical microlithography, self-assembled protein structures, or optical interference in a high-refractive index medium.

A viewer 110 according to one embodiment to view a form birefringent grating image, as described above, can be made as shown in FIG. 6. Actually the preferred method for viewing a form birefringent grating structure 111 is to illuminate it with diffuse white light through a circular polarizer 112 placed in proximity to the grating 111. Accordingly light from a source 113, held and positioned by a holder, is directed to a beamsplitter 115, where one linearly polarized component of the light is reflected onto the grating 111, while the orthogonally polarized light component is transmitted and absorbed at surface (not shown) which is painted black.

Figure 6:
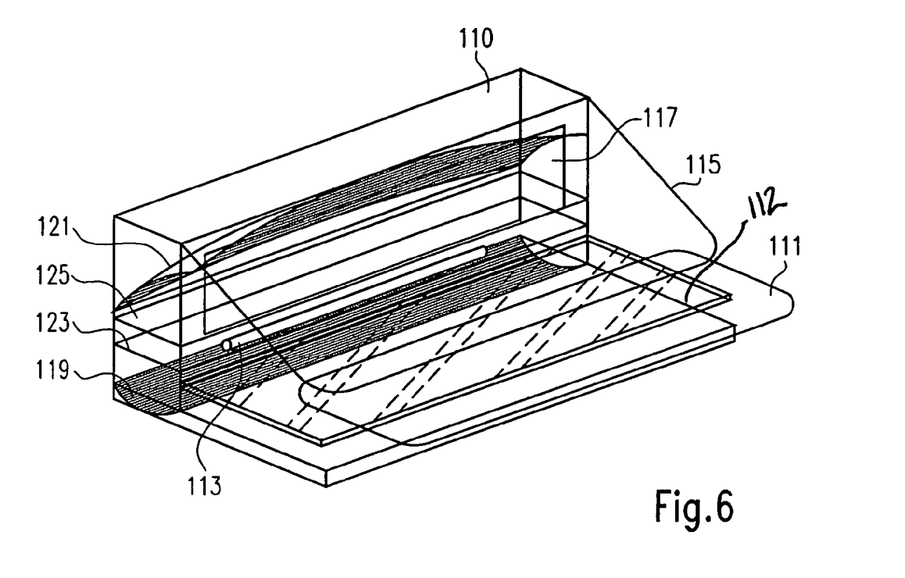
FIG. 6 represents a viewing device for a form birefringent grating according to a first embodiment, illuminating the grating through a circular polarizer.

The zero order diffracted light from the grating 111 has had its polarization altered by the grating 111 in a wavelength-dependent way, such that the change in polarization state of reflected (that is, zero-order diffracted) light depends on the light's wavelength. The polarization-altered component may be viewed alone if the beamsplitter 115 is a polarizing beamsplitter, in which case the polarization-rotated component passes vertically through the beamsplitter 115, while the other component is reflected back towards the light source 113.

Alternatively, the beamsplitter 115 may be a non-polarizing beamsplitter with a linear polarizer, as an analyzer (not shown) positioned behind the beamsplitter 115 in the viewing direction, while the illumination light from source 111 may be polarized orthogonally using a linear polarizer 117.

In addition, light directing components like curved mirrors 119, 121 can roughly collimate light from the light source 113, while one or more filters 123, 125 may be used to further collimate or otherwise control the spatial coherence of the light.

The portion of the light that passes vertically through the beamsplitter 115 may be viewed directly as a colored image. If the grating has the structure indicated in FIG. 3, with the depth and duty cycle of the grating at each point on the right-tilted portions corresponding to the color and brightness of a corresponding point in the right-eye member of a stereo pair, and the depth and duty cycle of the grating at each point on the left-tilted portion of the grating similarly corresponding to the color and brightness of a corresponding point on the left-eye member of a stereo pair, then an observer with normal stereo vision will see a three dimensional, color, stereoscopic image.

Figure 7:
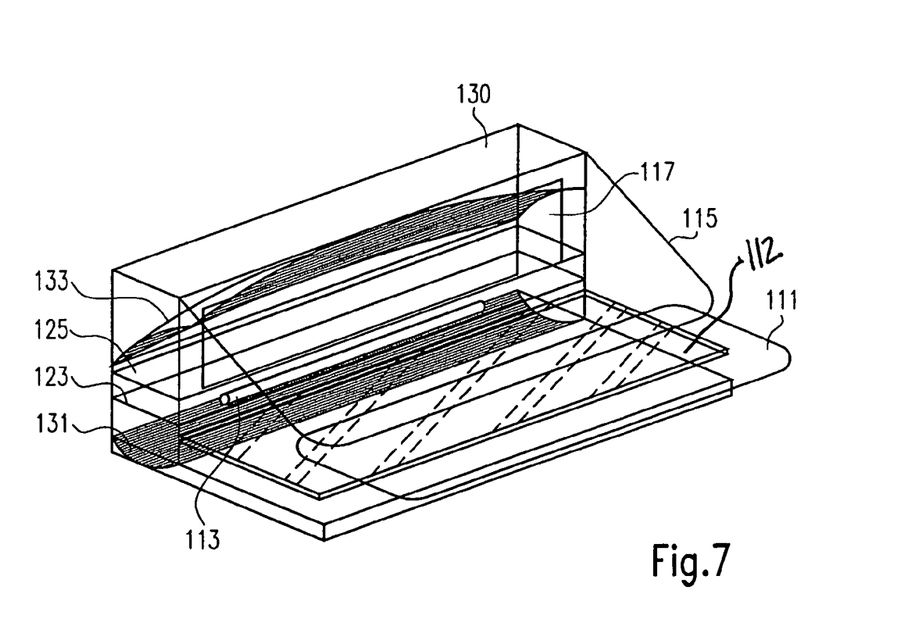
FIG. 7 represents a viewing device for a form birefringent grating according to a second embodiment, illuminating the grating with polarized light having a controlled degree of spatial incoherence and positioning a polarizer between the grating and the observer.

An alternative viewer 130 for the gratings according to various embodiments of the present invention is illustrated in FIG. 7. The viewer 130 uses some of the same components that are used in the viewer 110 of FIG. 6. Therefore, in the interest of brevity, an explanation of the structure and function of these components will not be repeated. The viewer 130 contains a light source 113 whose light is spread and slightly diffused by a spatial coherence controller 131, 133 so that, at the position of the grating 111, the light effectively converges with a certain horizontal range of angles. In particular, the angles are preferably −5° to 5°, more preferably −3° to 3°, and most preferably −1.5° to +1.5°. Thus, the zero-order diffracted light reflecting off from the grating 111 is divergent over the same angle at each point. This allows a person viewing the grating to move his or her head left to right by a small distance without moving his or her eyes out of the zero-order diffracted light, and thereby makes three-dimensional stereoscopic viewing easier. A larger amount of vertical diffusion can allow a relatively large amount of vertical motion of the person's head. In combination with a grating structure providing stereoscopic images, it is advantageous to illuminate the sample under a larger range of angles to facilitate the user the identification of the three dimensional character of the image.

According to further variants the analyzer provided behind the beam splitter or in front of the light source may be rotateably arranged to confirm the optical properties of the grating 111 in particular for two perpendicular polarization directions.

The viewer may include image capture and/or calorimetric processing electronics and a comparison subsystem to process and interpret the changes in appearance of the form birefringent grating structure 111 as the polarizing filter or polarized illumination source is rotated. The interpreted changes in the appearance of the grating structure can then be compared by the comparison subsystem such as a computer to a reference template stored in a memory to verify that the grating structure is authentic. The reader may also include means for imaging not only the zero order diffracted light but also other orders diffracted from the grating structure, a phenomenon which may arise due to ghosting, and comparing that diffracted light image to another reference template. If the interpreted changes match the reference templates, the grating structure may be judged authentic. In addition, varying the angle of tilt of the beamsplitter 115 or rotating or tilting the whole viewer 110, 130 relative to the grating 111 will select different components of diffracted light.

According to a variant the polarizer and/or the analyzer of the viewer can have properties that differ in predetermined regions. This is in particular of interest when used together with a form birefringent grating structure comprising a corresponding arrangement of regions.

Figure 8:
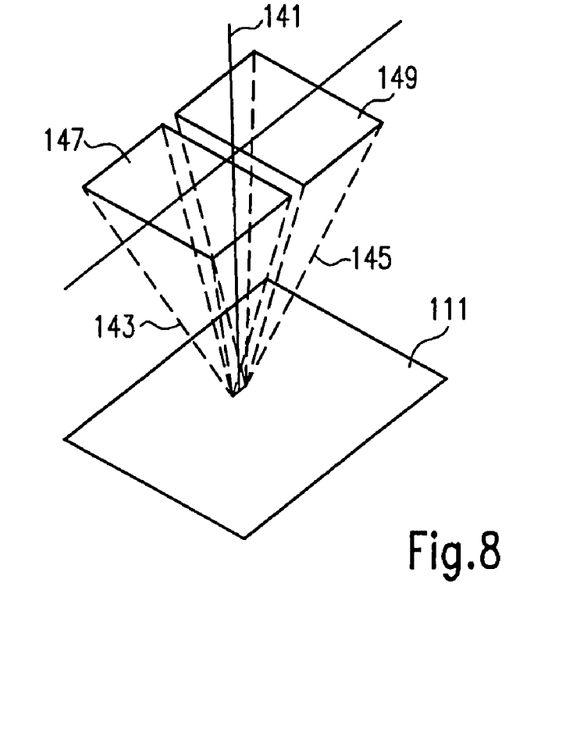
FIG. 8 schematically illustrates zero order reflected light leaving a form birefringent grating into a plurality of angles.

FIG. 8 illustrates a desirable amount of spatial incoherence resulting in zero-order light from a grating 111 being spread to a person's eyes when viewed with the viewer 130 illustrated in FIG. 7. "Spatial incoherence" is a term that refers to the apparent angular width of a light source. Starlight at the Earth's surface, for example, has much great greater spatial incoherence than sunlight because the star appears to be a pinpoint while the sun has about a half-degree of angular width. Incident light 141 impinging onto the grating under a predetermined range of angles is diffracted by grating 111. Zero order diffracted light 143 from the left-tilted strips in grating 111 travels to the person's left eye, while zero order diffracted light 145 from the right-tilted strips travels to the person's right eye, as long as each respective eye is within its corresponding "window" 147 and 149. Note that multiple tilt angles such as those shown in FIG. 4 may be configured to have an effect similar to a lateral diffuser, directing zero-order light into a range of angles and thereby extending the left-right viewing angle. In effect, such multiple tilt angles can provide a selected amount of spatial incoherence within the grating itself.

Various embodiments of the present invention provide anticountefeit security devices comprising a form birefringent grating structure as described above. Here the form birefringent grating structure is fabricated as a marking on a label, document or product. The arrangement of the polarization properties, the color properties and the effective tilts of the form birefringent grating structure are in the form of graphical designs or other recognizable patterns. Because counterfeiters will find it difficult to copy or reverse engineer such a form birefringent grating structure, authenticity of the marking can be determined by viewing the form birefringent grating structure using, e.g., a viewer as described above.

The form birefringent grating structures according to various embodiments of the invention can be applied to any of a wide variety of documents and things, including cards, checks, currency, credit cards, gift cards, access control cards, hang tags, decals, stickers, labels, authentication certificates, envelopes, packages, pharmaceuticals containers, pharmaceuticals capsules, licenses, license plates, vehicle use permits, coupons, wrist bands, official documents, certificates of title, optical recording media, CD-ROMs, DVDs, injection molded products, pressure molded products, embossed products, calendared products, passports, security seals, tamper-evident seals, coins, tokens, tickets, transit passes, packaging films, packaging components, security documents, paper currencies, credit cards, ID cards, bank checks, gift certificates, tax stamps, secure packaging and product marking.

If the form birefringent grating structure is composed of regions of variously oriented gratings, and it is viewed through a polarizer whose orientation varies in regions registered with respect to the regions on the form birefringent grating structure, the form birefringent grating structure image appearance will depend strongly on the position, shape and orientation of the polarizer's differently oriented regions. Accordingly, the form birefringent grating structure thus made may constitute an encrypted message, and the polarizer thus made may constitute a decryption filter to decrypt the message.

The various embodiments of the present invention can be used in conjunction with other security devices, features and markings. For example, a hologram may include a form birefringent grating structure according to one of the above cited embodiments, in one or more sub-regions, or a form birefringent grating structure may be coated with high refractive index material or low refractive index material, or may be metallized with portions of the metal removed, or may be embossed into isolated islands of embossable material on a surface. A form birefringent grating structure can also be used together with other security features such as infra-red fluorescent inks, microtaggants, magnetic inks, DNA taggants, color-variable inks, intaglio printing, UV fluorescent inks, RFID chips, "scrambled indicia", upconversion taggants, and so on, to provide "layered" or multiple security features on a document or product.

In addition, the various security features may be placed at different locations on the anticounterfeit security device, such that for example one part of the device carries a form birefringent grating structure, whereas a different position comprises UV fluorescent inks.

Furthermore the grating structure does not have to be in the form of parallel stripes, but can have any form suitable to produce the desired effects. For example, a grating that consists of concentric circles will produce a typical hourglass-shaped polarization image that rotates as it is viewed through a polarizing filter that rotates. By taking the polarization angles into account, a skilled graphic designer can design images that are animated by rotating the polarization of observed or incident light.

Figure 9:
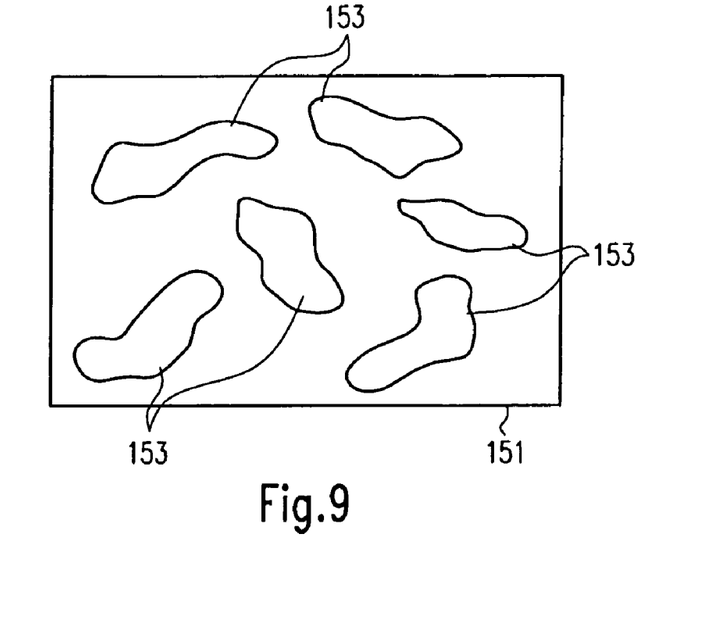
FIG. 9 illustrates an embodiment of an anticounterfeit security device according to one embodiment of the invention.

FIG. 9 illustrates an anticounterfeit security device according to one embodiment of the invention. It comprises a substrate 151 on which randomly formed and distributed islands 153 are provided which carry a form birefringent grating structure according to one of the above described embodiments. Instead of or in addition to the islands 153 also a layer with randomly distributed holes of various sizes could be provided on the substrate 151, wherein the layer carries the form birefringent grating structure.

The overall structure of the anticounterfeit security device of FIG. 9 can be at least partially be covered with a reflectance enhancing coating (not shown) and/or a transparent protective layer (not shown) can be provided over the anticounterfeit security device.

Figure 10:
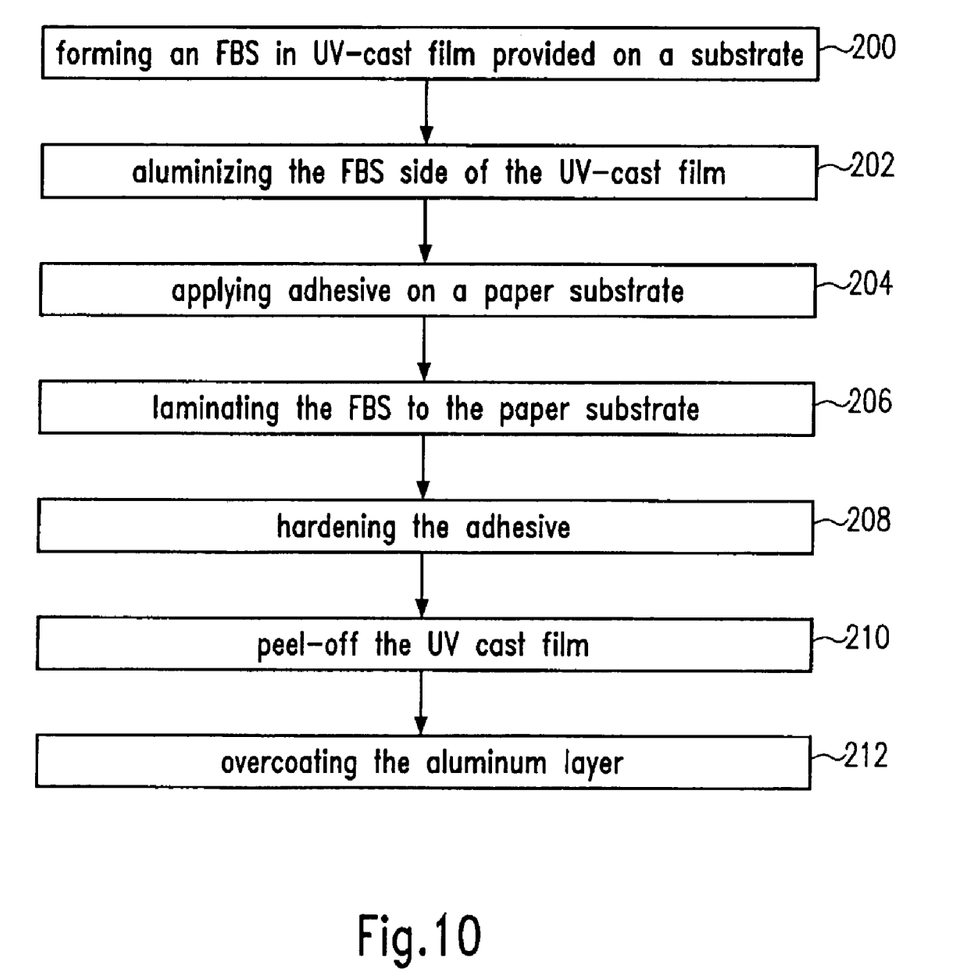
FIG. 10 is a block diagram illustrating a method for fabricating an anticounterfeit security device according to one embodiment of the invention.

A particularly effective anti-counterfeit security device can be made by casting a form birefringent grating structure according to one of the above-described embodiments onto a substrate, such as a paper substrate, as illustrated in the block diagram of FIG. 10. In Step 200, the form birefringent grating structure (FBS) is formed in an UV-cast film on a flexible substrate wherein a UV resin is chosen which has a relatively low adhesion to aluminum to thereby create an embossing die. The following step 202 include aluminizing the form birefringent grating structure side of the UV-cast film. Then in step 204 dots of an adhesive are applied onto a suitable substrate, e.g. paper, in particular in a randomly patterned way or nonrandomly patterned way to create a non-simply connected adhesive layer. The term "non-simply connected" as used herein denotes a surface that is discontinuous in some sense; e.g., it may have holes or islands, or both. These can be arranged in a regular or irregular pattern. As the islands of the material carry the grating, it becomes very difficult for counterfeiters to make mechanical copies of the grating pattern the aluminized form birefringent grating structure side of the UV-cast film is laminated to the paper substrate in step 206 using the printed adhesive dots, thus impressing the grating structure into the adhesive. During step 208 the adhesive dots are cured and hardened. Then in step 210 the UV-cast film is peeled off the paper substrate, thereby leaving the aluminum layer on the surface of the hardened adhesive on the paper. And finally, in step 212, the aluminum layer is overcoated with a transparent, relatively smooth protective resin layer.

In an alternative production process the surface of the form birefringent grating structure after having been formed in resist is preferably electroplated with a suitable material, such as nickel. In the event nickel is used, it may be electroplated to a suitable thickness, such as about 50 microns. The nickel is then peeled off of the resist to provide a "nickel shim" forming the embossing die. The nickel shim is wrapped around a headed roller and used to emboss a thermoplastic film. The thermoplastic film is subsequently aluminized in a vacuum metalizer; and the metalized film is converted to a label.

Any suitable means of replication can be used to manufacture replicas of the form birefringent grating structure, including thermal embossing, UV casting or embossing, pressure molding, electroforming, solvent casting, injection molding, epoxy casting, and spray molding. The preferred means of replication however is UV casting because UV casting allows high speed and extremely high fidelity mass production of nanometer-scale microstructures in a roll-to-roll system. A suitable UV embossing process or continuous casting process is described in U.S. Pat. Nos. 4,758,296 and 4,906,315. The UV embossing process has the advantage of having no fidelity losses due to thermal expansion and shrinkage of the resin. Preferably, the UV resin is selected from commercially available resins to provide good adhesion to the substrate, low shrinkage upon curing, and toughness and slight elasticity of the cured resin. Toughness and elasticity are preferred because the grating grooves may be deep relative to their width, so that brittle cured UV resin would break off and become lodged in the grating die.

The anticounterfeit security device described is particularly effective because even though the form birefringent grating structure is a surface relief structure, it is very difficult to gain access to the relief surface without major damage to the surface relief structure if the form birefringent grating structure is in the form of disconnected islands of hardened adhesive adhered to paper.

The terms used in the following claims and in the description are used in the broadest meaning possible. "Embossing die" can mean any material object with a relief surface used to emboss or otherwise impress a surface relief pattern into a second surface. For example, an embossed film can be an embossing die if it is used to impress a surface relief pattern into another film. "Polarization" refers to any polarization state including but not limited to linear polarization, circular polarization and elliptical polarization. A polarization state "orthogonal" to a first polarization state is a polarization state that can be added to the first state to produce a linearly polarized state. For example, a vertically oriented linear state is orthogonal to a horizontally oriented linear state because if the two are added together in-phase, they form a linear polarization state at 45 degrees to the original two states. Furthermore all embodiments of the invention have been described in a reflective mode. However, the same advantages can also be achieved with grating structures functioning in a transmissive mode.

What is claimed is:

1. A reflective form birefringent grating fabricated on a substrate, the structure having a plurality of grooves, each of the grooves being formed by a pair of grating walls extending from a groove bottom in a first direction and terminating in a respective top extending to one of the walls of an adjacent groove, the respective tops of a series of the grooves in a first region of the grating structure being substantially parallel to each other and situated at respective locations that gradually change in the first direction to provide an effective tilt corresponding to the rate at which the location of the tops change in the first direction; the grooves having a constant depth throughout at least one region of the grating structure, the constant depth selected to impose a selected phase delay on light of a selected wavelength from the bottom of a groove with respect to the same light reflected from the top of a groove.

2. The reflective form birefringent grating structure of claim 1 wherein the grating structure includes a plurality of regions and wherein the grating structure in at least some of the regions differ from each other with respect to effective tilt and at least one of the following: grating orientation, period, phase, depth, or shape.

3. The reflective form birefringent grating structure of claim 2 wherein the depths of the grooves in a plurality of the regions increase at respective rates to provide effective tilts that are operable to direct zero-order diffracted light from the regions into different predetermined directions when the grating structure is illuminated by a predetermined light source from a predetermined direction and position with respect to the grating structure, such that the zero-order light from the regions displays a three-dimensional stereographic image.

4. The reflective form birefringent grating structure of claim 1 wherein the form birefringent grating structure comprises a pixel array having a plurality of pixels, each pixel being composed of a plurality of subpixels having different groove depths configured to correspond to different respective colors, each subpixel having at least two different effective tilt angles such that the form birefringent grating structure provides a 3D stereoscopic color image when illuminated.

* * * * *